United States Patent
Yi et al.

(10) Patent No.: US 11,350,380 B2
(45) Date of Patent: May 31, 2022

(54) METHOD AND APPARATUS FOR SHIFTING BOUNDARY OF UPLINK SUBFRAME OR UPLINK SLOT IN WIRELESS COMMUNICATION SYSTEM

(71) Applicant: LG Electronics Inc., Seoul (KR)

(72) Inventors: Yunjung Yi, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 16/652,869

(22) PCT Filed: Oct. 12, 2018

(86) PCT No.: PCT/KR2018/012012
§ 371 (c)(1),
(2) Date: Apr. 1, 2020

(87) PCT Pub. No.: WO2019/074311
PCT Pub. Date: Apr. 18, 2019

(65) Prior Publication Data
US 2020/0252895 A1    Aug. 6, 2020

Related U.S. Application Data

(60) Provisional application No. 62/571,743, filed on Oct. 12, 2017.

(51) Int. Cl.
*H04J 3/06* (2006.01)
*H04W 56/00* (2009.01)
(Continued)

(52) U.S. Cl.
CPC ....... *H04W 56/0045* (2013.01); *H04L 5/0055* (2013.01); *H04W 72/0446* (2013.01); *H04W 74/0833* (2013.01)

(58) Field of Classification Search
CPC ......... H04W 56/0045; H04W 72/0446; H04W 74/0833; H04W 56/0005; H04L 5/0055
(Continued)

(56) References Cited

U.S. PATENT DOCUMENTS

| | | | |
|---|---|---|---|
| 2011/0171949 A1 | 7/2011 | Liano et al. | |
| 2013/0188473 A1* | 7/2013 | Dinan ................... | H04W 28/18 370/216 |

(Continued)

FOREIGN PATENT DOCUMENTS

| | | |
|---|---|---|
| CN | 104620516 | 5/2015 |
| CN | 105519014 | 4/2016 |
| CN | 106031071 | 10/2016 |

OTHER PUBLICATIONS

Ericsson, "On maximum TA and reduced processing time," R1-1712914, 3GPP TSG-RAN WG1 Meeting #90, Prague, Czech Republic, dated Aug. 21-25, 2017, 10 pages.

(Continued)

*Primary Examiner* — Mang Hang Yeung
(74) *Attorney, Agent, or Firm* — Fish & Richardson P.C.

(57) ABSTRACT

A method and apparatus for shifting boundary of an uplink (UL) subframe and/or UL slot in a wireless communication system is provided. A user equipment (UE) receives information on a timing advance (TA) offset from the network, and shifts the boundary of the UL subframe and/or the UL slot based on a TA and the TA offset. The UE transmits a UL signal as a response to a downlink (DL) signal in the shifted UL subframe and/or UL slot.

9 Claims, 18 Drawing Sheets

(51) Int. Cl.
*H04L 5/00* (2006.01)
*H04W 72/04* (2009.01)
*H04W 74/08* (2009.01)

(58) Field of Classification Search
USPC .......................................................... 370/350
See application file for complete search history.

(56) References Cited

U.S. PATENT DOCUMENTS

| | | | |
|---|---|---|---|
| 2015/0282159 A1 | 10/2015 | Vrind | |
| 2016/0150532 A1 | 5/2016 | Bhushan et al. | |
| 2016/0345316 A1* | 11/2016 | Kazmi | H04W 56/0045 |
| 2017/0223564 A1 | 8/2017 | Dinan | |
| 2018/0192383 A1* | 7/2018 | Nam | H04J 11/00 |
| 2018/0367262 A1* | 12/2018 | Hwang | H04L 1/1854 |
| 2020/0359406 A1* | 11/2020 | Li | H04W 72/1289 |

OTHER PUBLICATIONS

Huawei, HiSilicon, "Overview of bandwidth part, CA, and DC operation including SRS switching," R1-1715425, 3GPP TSG RAN WG1 Meeting NR#3, Nagoya, Japan, dated Sep. 18-21, 2017, 16 pages.

MediaTek Inc., "UE Processing Time Evaluation and Timing Relationship," R1-1716661, 3GPP TSG RAN WG1 Meeting NR#3, Nagoya, Japan, dated Sep. 18-21, 2017, 8 pages.

Nokia, Nokia Shanghai Bell, "On the open aspects of HARQ management," R1-1715546, 3GPP TSG RAN WG1 NR Ad-Hoc #3, Nagoya, Japan, dated Sep. 18-21, 2017, 11 pages.

Nokia, Nokia Shanghai Bell, "Timing aspects for HARQ-ACKfeedback," R1-1714015, 3GPP TSG-RAN WG1#90, Prague, Czech Republic, dated Aug. 21-25, 2017, 8 pages.

Extended European Search Report in European Appln. No. 18865660. 7, dated Jun. 21, 2021, 9 pages.

LG Electronics, "Timing advance for TDD-FDD carrier aggregation," R1-140314, 3GPP TSG RAN WG1 Meeting #76, Prague, Czech Republic, dated Feb. 10-14, 2014, 3 pages.

Office Action in Chinese Appln. No. 201880063934.6, dated Jul. 12, 2021, 14 pages (with English translation).

Samsung, "On UL Transmission Timing Aspects," R1-1716021, 3GPP TSG RAN WG1 Meeting NR#3, Nagoya, Japan, dated Sep. 18-21, 2017, 2 pages.

3GPP, "3rd Generation Partnership Project; Technical Specification Group Radio Access Network; UTRAN Iub interface Node B Application Part (NBAP) signaling (Release 8)," TS 25.433 V8.14. 0, Dec. 2013, 1182 pages.

Luo et al., "A Novel Solution to Improve Uplink Synchronization Control in OFDM-based Mobile Networks," IEEE Wireless Communications and Networking Conference (WCNC), Apr. 2013, pp. 947-951.

Office Action in Chinese Appln. No. 201880063934.6, dated Dec. 22, 2021, 11 pages (with English translation).

Takeda, "New Radio (NR) Access Technology," RP-171783, Status Report to TSG, Presented at 3GPP TSG RAN meeting #77, Sapporo, Japan, Sep. 11-14, 2017, 284 pages.

\* cited by examiner

METHOD AND APPARATUS FOR SHIFTING BOUNDARY OF UPLINK SUBFRAME OR UPLINK SLOT IN WIRELESS COMMUNICATION SYSTEM

CROSS-REFERENCE TO RELATED APPLICATIONS

This application is a National Stage application under 35 U.S.C. § 371 of International Application No. PCT/KR2018/012012, filed on Oct. 12, 2018, which claims the benefit of U.S. Provisional Application No. 62/571,743, filed on Oct. 12, 2017. The disclosures of the prior applications are incorporated by reference in their entirety.

TECHNICAL FIELD

The present invention relates to wireless communications, and more particularly, to a method and apparatus for shifting boundary of uplink subframe and/or uplink slot in a new radio access technology (RAT) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

It is generally expected that timing between DL signal and UL signal will be reduced, specifically for URLLC. For example, timing between downlink (DL) data and uplink (UL) hybrid automatic repeat request acknowledgement (HARQ-ACK) or timing between UL grant and UL data may be reduced, compared to timing in 3GPP LTE/LTE-A. In order to efficiently support the reduced timing between DL signal and UL signal in NR, the present invention discusses details on UL subframe/slot boundary shift.

In an aspect, a method for shifting boundary of an uplink (UL) subframe and/or UL slot by a user equipment (UE) in a wireless communication system is provided. The method includes receiving a downlink (DL) signal from a network, receiving information on a timing advance (TA) offset from the network, shifting the boundary of the UL subframe and/or the UL slot based on a TA and the TA offset, and transmitting a UL signal as a response to the DL signal in the UL subframe and/or UL slot.

In another aspect, a user equipment (UE) in a wireless communication system is provided. The UE includes a memory, a transceiver, and a processor, operably coupled to the memory and the transceiver, that controls the transceiver to receive a downlink (DL) signal from a network, controls the transceiver to receive information on a timing advance (TA) offset from the network, shifts boundary of an uplink (UL) subframe and/or UL slot based on a TA and the TA offset, and controls the transceiver to transmit a UL signal as a response to the DL signal in the UL subframe and/or UL slot.

In another aspect, a method for receiving an uplink (UL) signal by a base station (BS) in a wireless communication system is provided. The method includes transmitting a downlink (DL) signal to a user equipment (UE), transmitting information on a timing advance (TA) offset to the UE, and receiving the UL signal as a response to the DL signal in a UL subframe and/or UL slot which is shifted based on a TA and the TA offset.

Reduced timing between DL signal and UL signal in NR can be efficiently supported.

BRIEF DESCRIPTION OF THE DRAWINGS

FIG. 14-(a) shows DL portion.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
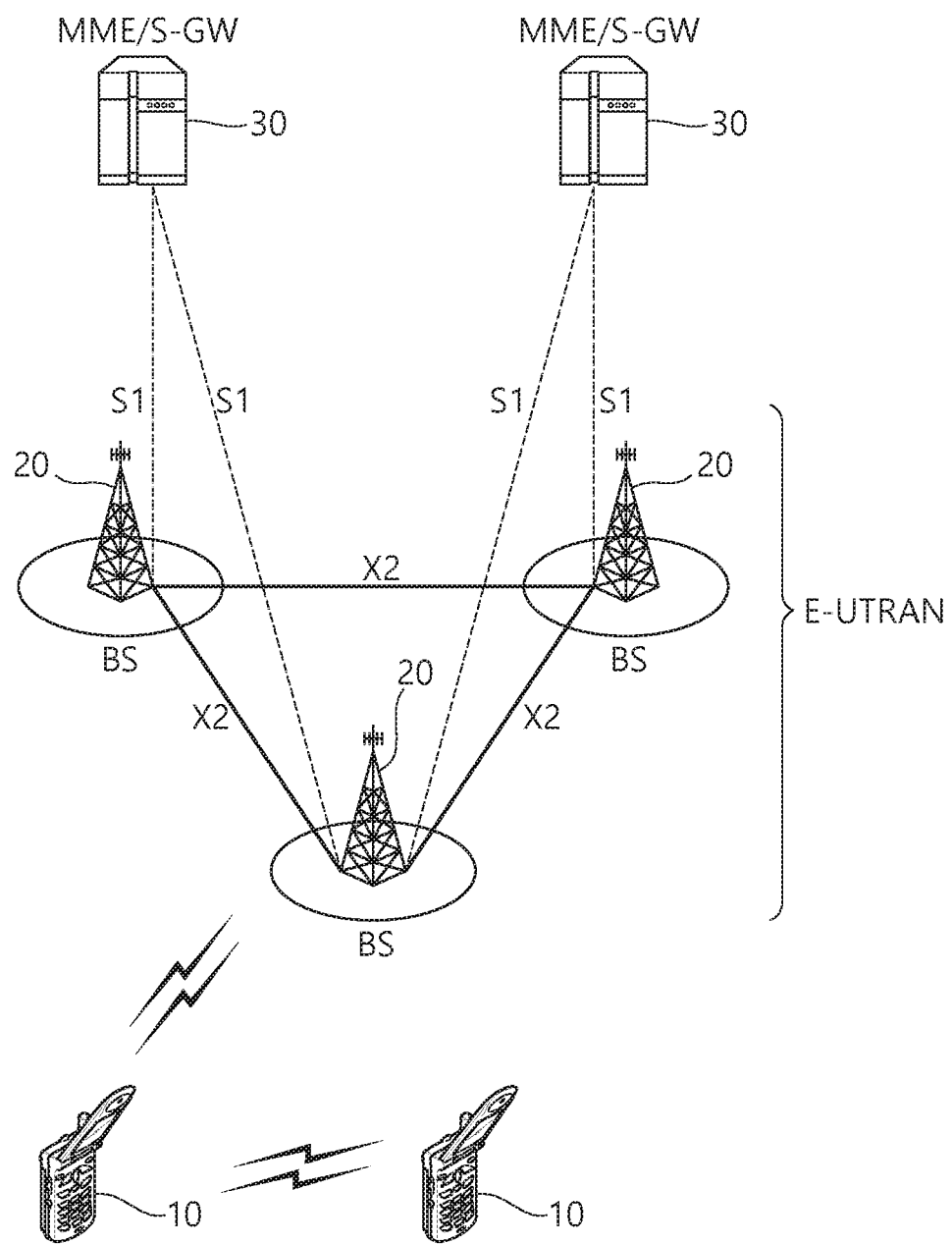
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN).

The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
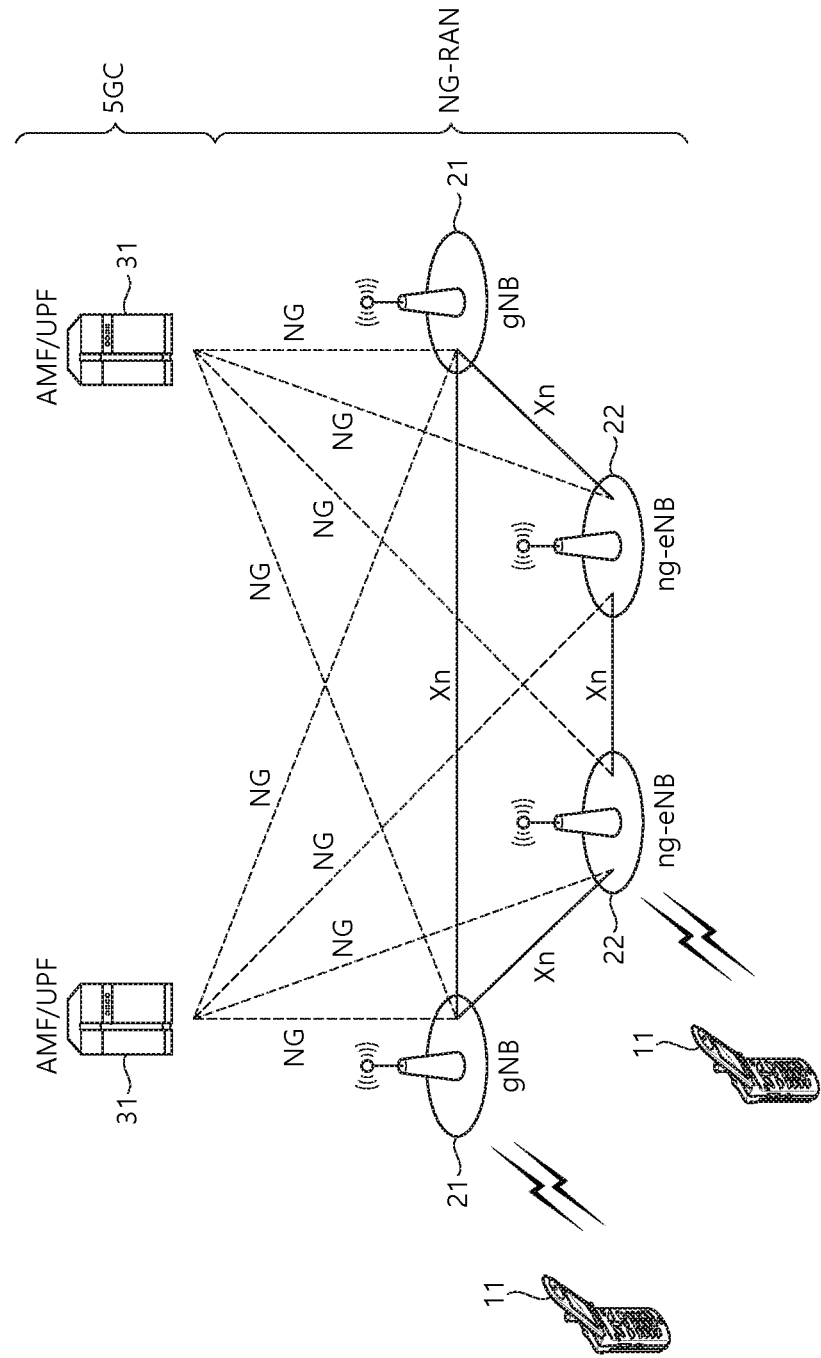
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g. μ=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to μ=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbol in the present specification may refer to an OFDM/OFDMA symbol, or SC-FDMA symbol, etc. A CP may be located between each symbol.

Figure 3:
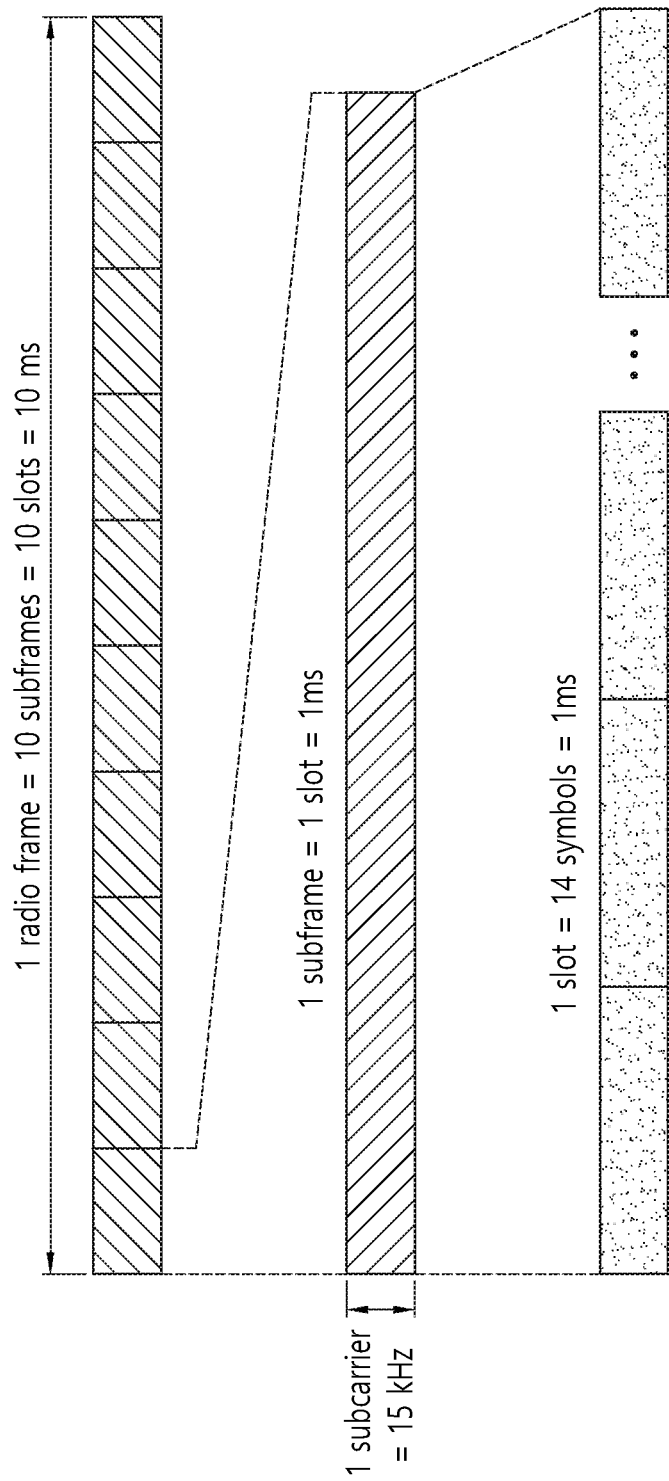
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to μ=0.

Figure 4:
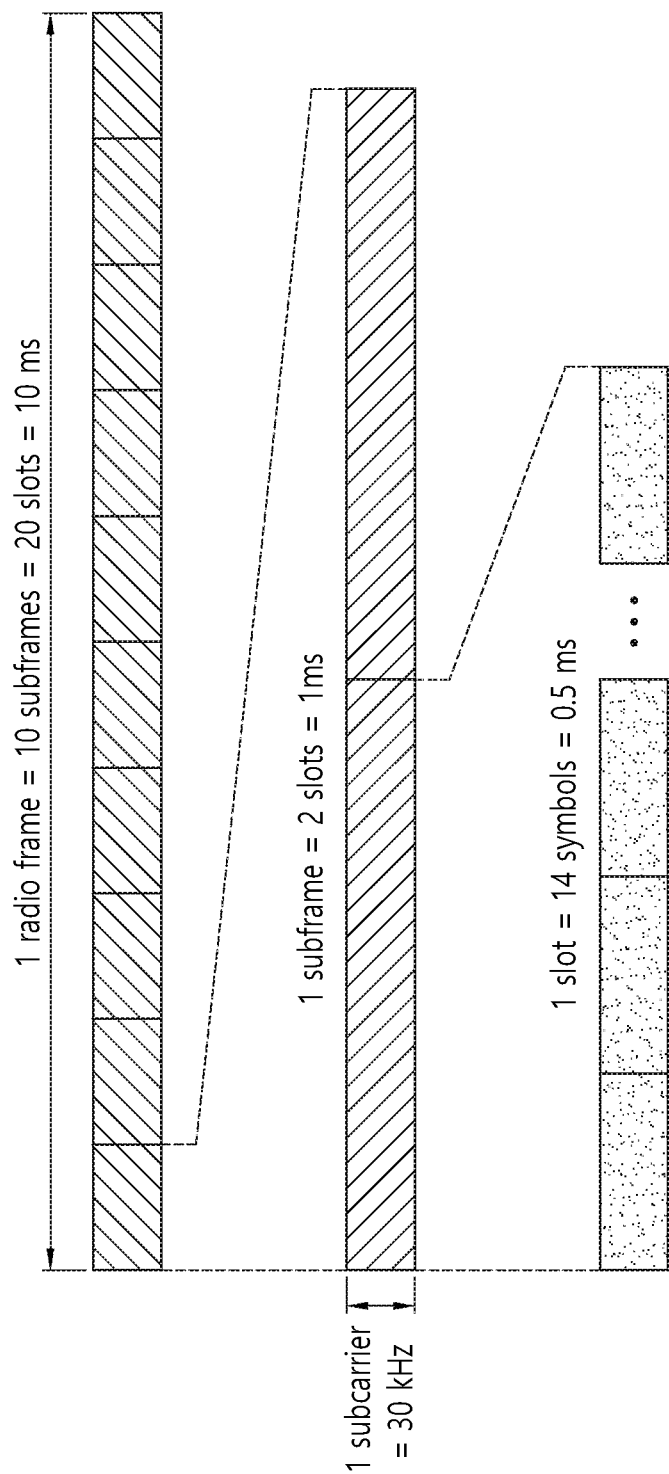
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to μ=1.

Meanwhile, a frequency division duplex (FDD) and/or a time division duplex (TDD) may be applied to a wireless communication system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 3 shows an example of a slot format which is identified by a corresponding format index. The contents of the Table 3 may be commonly applied to a specific cell, or may be commonly applied to adjacent cells, or may be applied individually or differently to each UE.

TABLE 3

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| . . . | | | | | | | | | | | | | | |

For convenience of explanation, Table 3 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
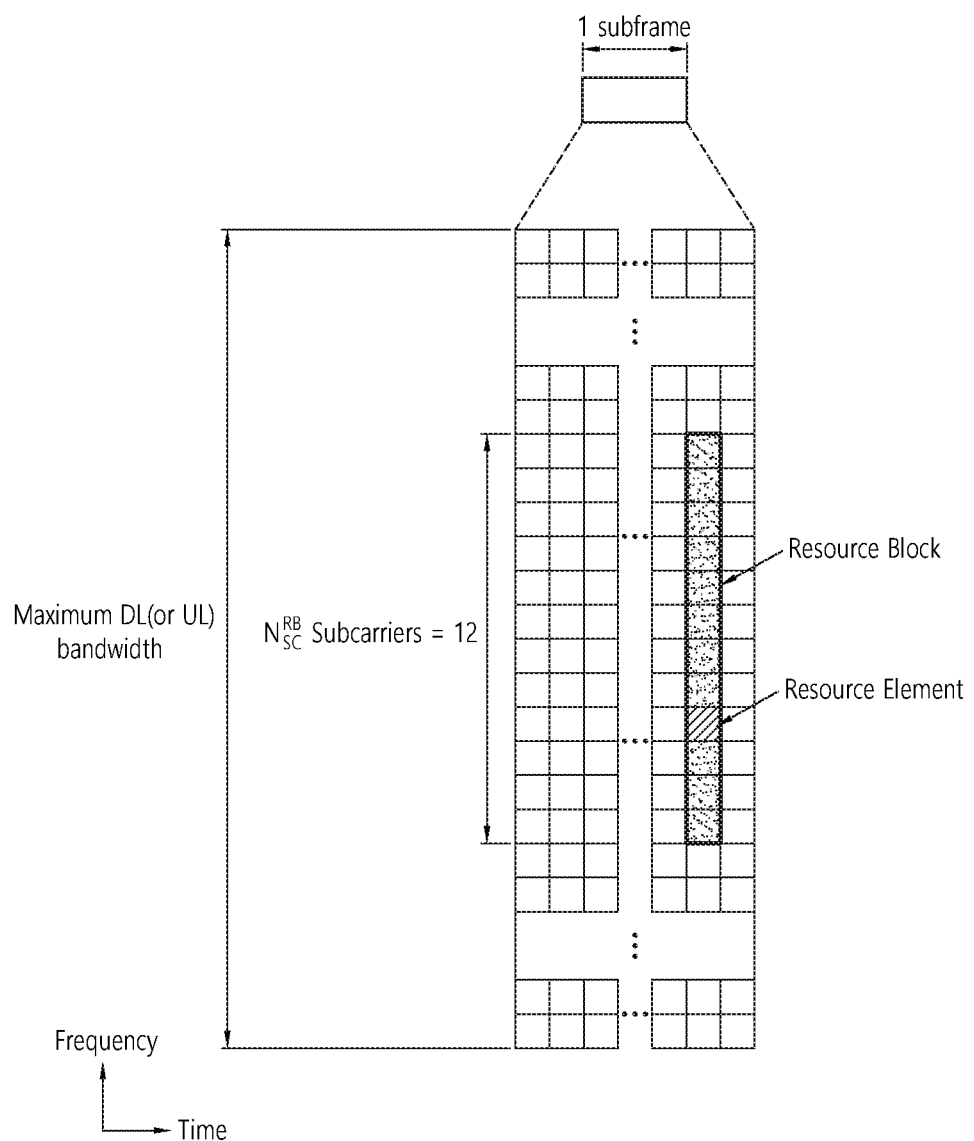
FIG. 5 shows an example of a resource grid to which technical features of the present invention can be applied.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14·2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
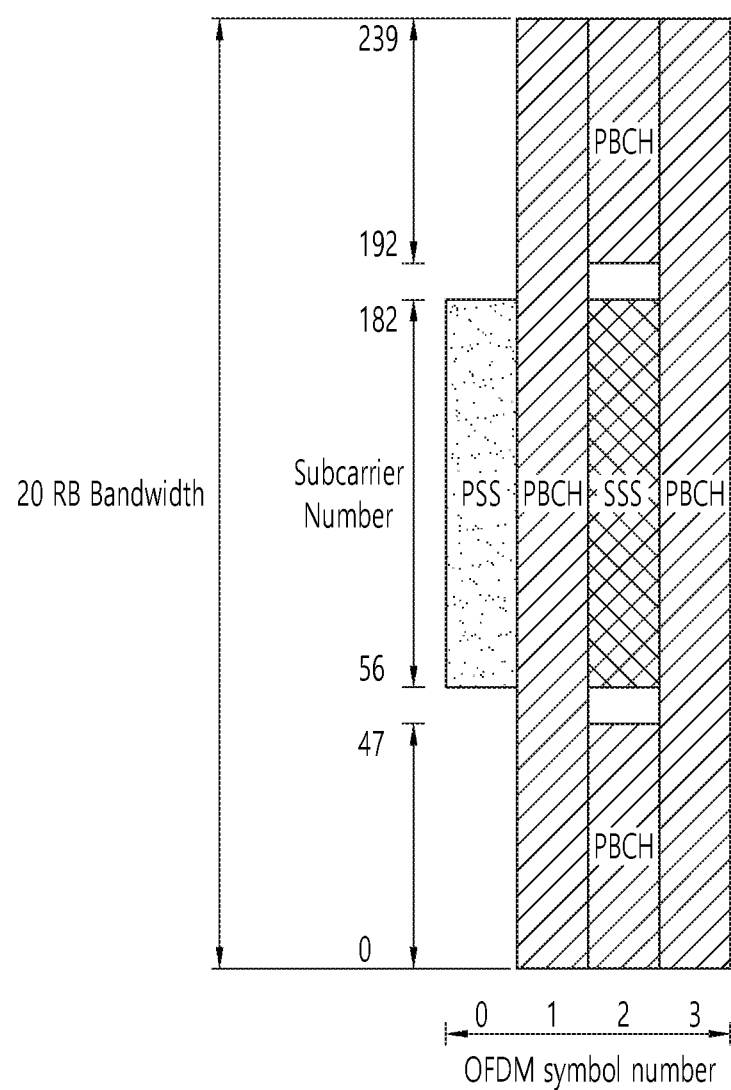
FIG. 6 shows an example of a synchronization channel to which technical features of the present invention can be applied.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB #L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR.

Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
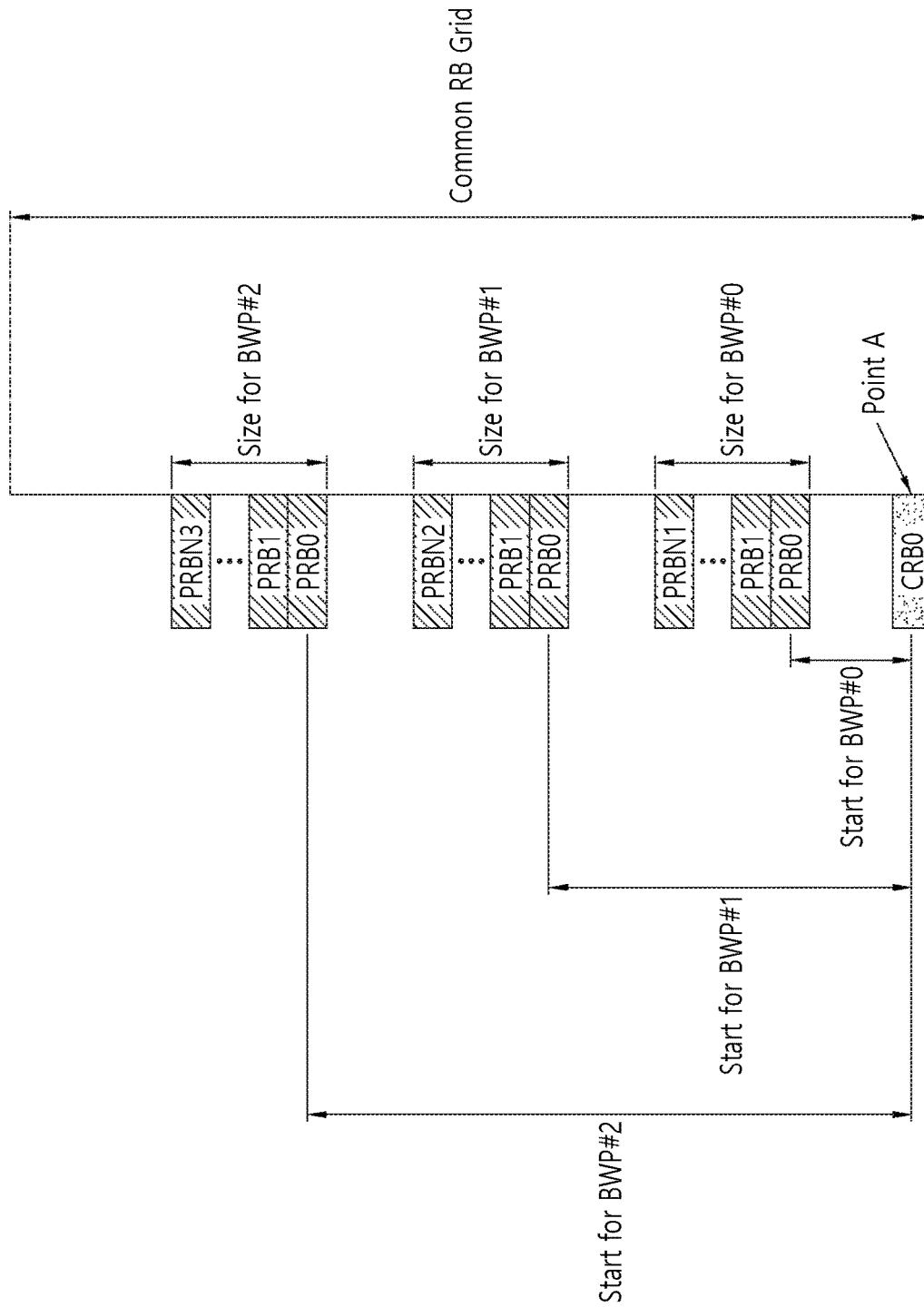
FIG. 7 shows an example of a frequency allocation scheme to which technical features of the present invention can be applied.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0.

For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
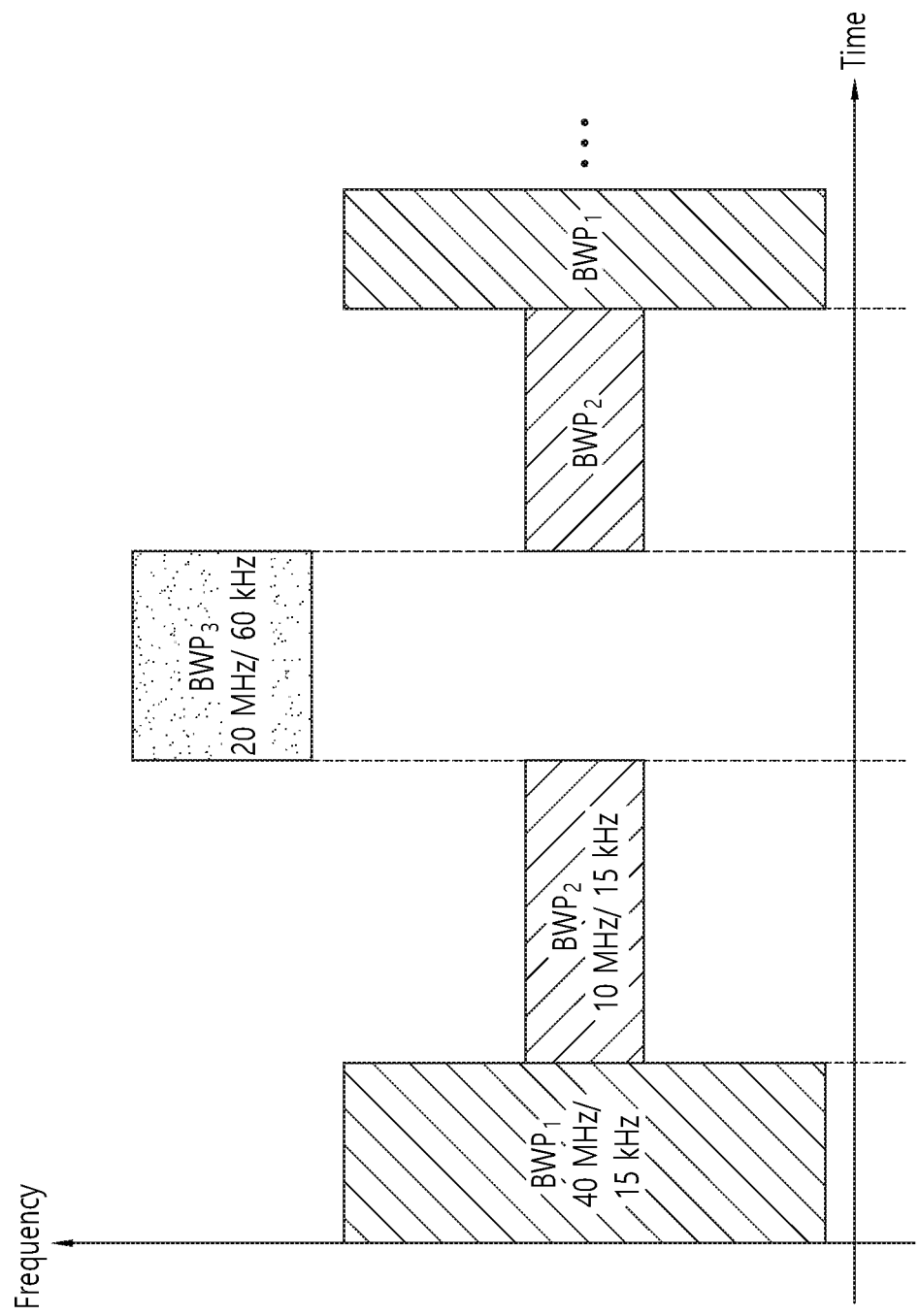
FIG. 8 shows an example of multiple BWPs to which technical features of the present invention can be applied.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Hereinafter, a method for shifting boundary of UL subframe and/or UL slot according to embodiments of the present invention is described. The present invention proposes NR frame structure to support various use case with potential lower latency operation.

For the present invention, the followings are basically assumed.

For enhanced mobile broadband (eMBB) use case (or, data rate and/or transport block size (TBS) is greater than X), basic minimum timing for acknowledgement/non-acknowledgment (ACK/NACK) transmission may be n+k, where n is the subframe/slot index of end of DL data transmission. That is, when DL data transmission ends at subframe/slot n, ACK/NACK transmission starts at subframe/slot n+k. Furthermore, basic minimum timing for UL data transmission may be n+k, where n is the subframe/slot index of end of UL grant transmission. That is, when UL grant transmission ends at subframe/slot n, UL data transmission starts at subframe/slot n+k. Generally, for eMBB use case, basic minimum timing for UL signal transmission may be n+k, where n is the subframe/slot index of end of corresponding DL signal transmission. For example, k may be 2 or 3.

For ultra-reliable and low latency communications (URLLC) use case (or, data rate and/or TBS is lower than X but larger than Y), basic minimum timing for ACK/NACK transmission may be n+k1, where n is the subframe/slot index of end of DL data transmission. That is, when DL data transmission ends at subframe/slot n, ACK/NACK transmission starts at subframe/slot n+k1. Furthermore, basic minimum timing for UL data transmission may be n+k1, where n is the subframe/slot index of end of UL grant transmission. That is, when UL grant transmission ends at subframe/slot n, UL data transmission starts at subframe/slot n+k1. Generally, for URLLC use case, basic minimum timing for UL signal transmission may be n+k1, where n is the subframe/slot index of end of corresponding DL signal transmission. For example, k1 may be 1.

For massive machine-type-communications (mMTC) and/or internet-of-things (IoT) use case (or, data rate and/or TBS is lower than Y), basic minimum timing for ACK/NACK transmission may be n+k2, where n is the subframe/slot index of end of DL data transmission. That is, when DL data transmission ends at subframe/slot n, ACK/NACK transmission starts at subframe/slot n+k2. Furthermore, basic minimum timing for UL data transmission may be n+k2, where n is the subframe/slot index of end of UL grant transmission. That is, when UL grant transmission ends at subframe/slot n, UL data transmission starts at subframe/slot n+k2. Generally, for mMTC and/or IoT use case, basic minimum timing for UL signal transmission may be n+k2, where n is the subframe/slot index of end of corresponding DL signal transmission. For example, k2 may be 12.

If overall latency to prepare ACK/NACK transmission (including control/data decoding and timing advance (TA)) is less than k (or k1 or k2)–delta, UL subframe/slot boundary may be shifted based on TA offset. The TA offset may be equal to delta. A value of the TA offset may be positive, which means that the UL subframe/slot boundary may be shifted backwardly (i.e. same direction with TA). Or, a value of the TA offset may be negative, which means that the UL subframe/slot boundary may be shifted forwardly (i.e. opposite direction with TA). By shifting UL subframe/slot boundary based on the TA offset, actual latency between DL data transmission to ACK/NACK transmission may be set to k–delta (or k1–delta or k2–delta).

Figure 9:
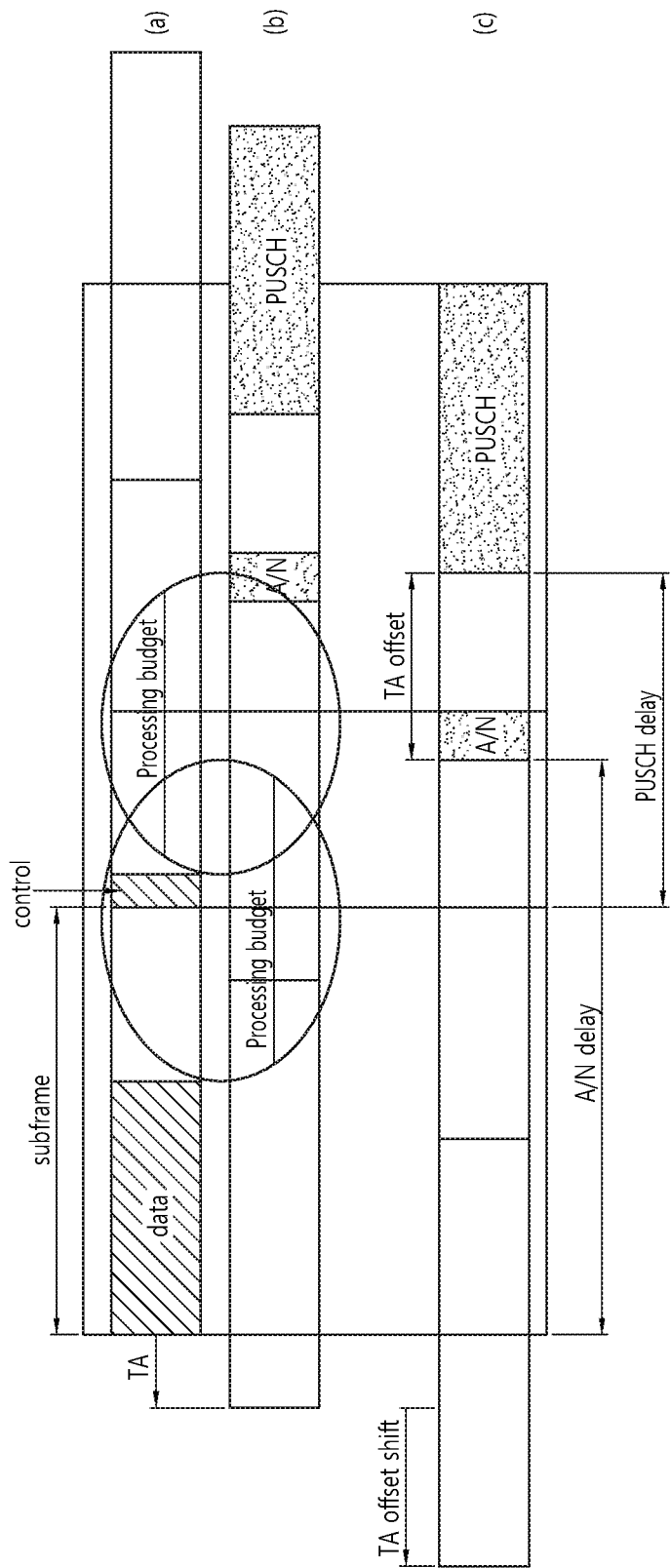
FIG. 9 shows an example of UL subframe/slot shift according to an embodiment of the present invention.

FIG. 9 shows an example of UL subframe/slot shift according to an embodiment of the present invention. FIG. 9-(a) shows DL portion. FIG. 9-(b) shows UL portion in which timing of UL transmission is shifted by TA according to the prior art. FIG. 9-(c) shows UL portion in which timing of UL transmission is further shifted by the TA offset according to the present invention.

By shifting UL subframe/slot boundary based on the TA offset, the overall latency for ACK/NACK transmission delay and PUSCH delay can be reduced. The shifting of UL subframe/slot boundary may be done per UE-specific manner. If the network supports full duplex radio (FDR), the shifting of UL subframe/slot boundary may be easy. Or, the shifting of UL subframe/slot boundary may be done per cell-common manner, e.g. based on overall UE capability.

Figure 10:
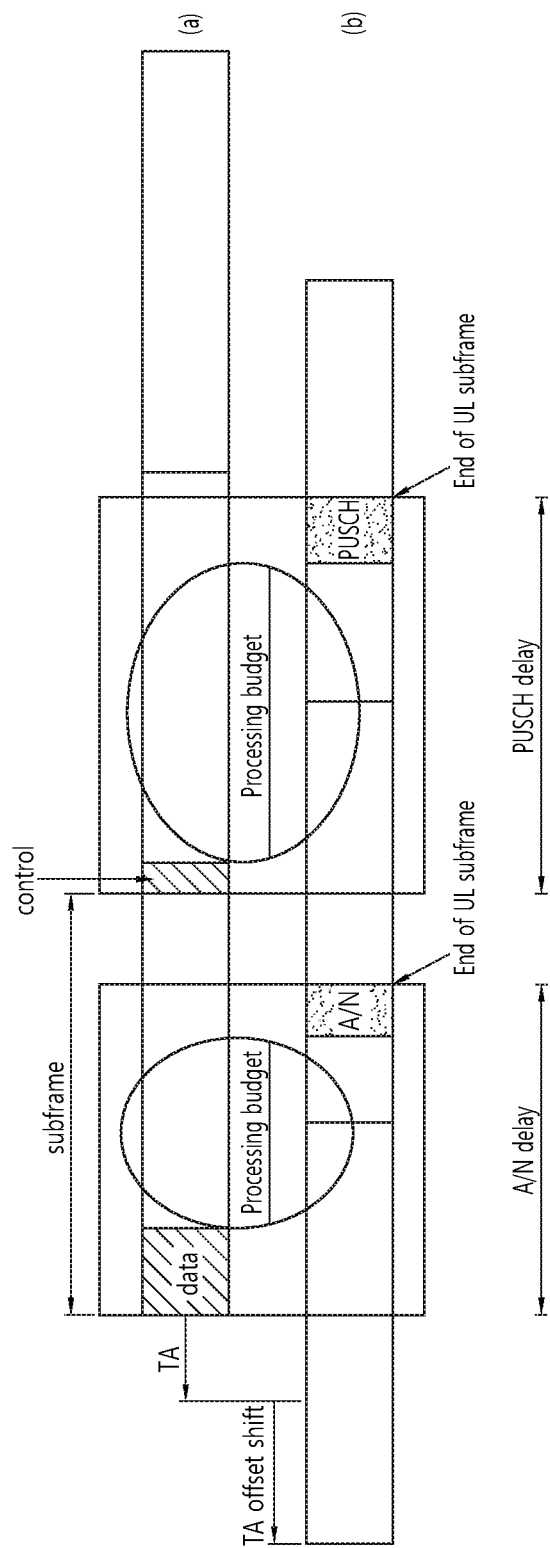
FIG. 10 shows another example of UL subframe/slot shift according to an embodiment of the present invention.

FIG. 10 shows another example of UL subframe/slot shift according to an embodiment of the present invention. After shifting UL subframe/slot boundary based on the TA offset, the UE may be able to further adjust size of resource unit depending on scheduled data. For example, when the size of resource unit becomes smaller than subframe/slot–TA (i.e. DL data and ACK/NACK signal can belong to the same subframe), the UE may adjust the size of its resource unit. FIG. 10-(a) shows DL portion. FIG. 10-(b) shows UL portion in which timing of UL transmission is further shifted by the TA offset according to the present invention. Referring to FIG. 10-(b), the size of resource unit is adjusted based on the scheduled data. For example, by reducing data scheduling size, the overall processing latency can be reduced, and size of the resource unit can be smaller than subframe/slot size–TA. In this case, a UE may be allowed to transmit ACK/NACK signal in early timing at the middle of UL subframe/slot. In this case, UL subframe/slot for ACK/NACK transmission may end earlier than regular subframe/slot boundary. For PUSCH, processing time can be reduced with smaller size transmission or shorter transmission of PUSCH. In this case, the size of resource unit can be smaller than subframe/slot size–TA. The PUSCH may be transmitted in early timing at the middle of UL subframe/slot. The UL subframe/slot for PUSCH transmission may end earlier than regular subframe/slot boundary.

As mentioned above, multiple process or multiple overlapped resource units can be supported, which may complicate the specification.

Meanwhile, it important to support high peak data rate as well as low latency. Accordingly, the followings may be further considered.

(1) UL subframe/slot boundary shift where ACK/NACK transmission can occur in the middle of UL subframe/slot, which may allow fast turn-around by the network to minimize round trip time (RTT)

(2) Aggregation of slot and/or mini-slot

In shifting UL subframe/slot boundary, the following options may be considered.

(1) Configuring TA Offset Value in RMSI

TA offset value may be configured in RMSI in terms of symbols based on numerology used in SS block. Or, TA offset value may be configured in RMSI in terms of symbols based on numerology used in RSMI. Or, TA offset value may be configured in RMSI in terms of symbols with a numerology used for subframe/slot duration, particularly for UL transmission.

(2) Configuring Fixed TA Offset Value Which is Applied to Each TA Value Regardless of Configuration The fixed TA offset value may be determined per frequency range or frequency band. Whether the fixed TA offset value is applied or not may be indicated by 1 bit in RMSI.

If this is used, the TA offset value may also be applied to PRACH transmission. In other words, for the PRACH transmission, a UE may apply the fixed TA offset as TA (assuming TA value=fixed TA offset+0). After TA is configured, a UE may transmit PRACH preamble at t0−TA−fixed TA offset. The fixed TA offset value may be defined as a constant number which may be different per frequency band or frequency range. The fixed TA offset value may be configured in terms of symbols based on numerology used in SS block. Or, the fixed TA offset value offset value may be configured in terms of symbols based on numerology used in RSMI. Or, the fixed TA offset value may be configured in terms of symbols with a numerology used for subframe/slot duration, particularly for UL transmission.

(3) Configuring TA Offset Value in TA Value

In this case, there may be a gap between PRACH transmission and PUSCH transmission by the TA offset for UEs sharing the same TA. In this sense, for PRACH reception, the network may require resource for TAmax (supported by the PRACH formats, or max propagation delay)+PRACH resource duration+TA offset.

Figure 11:
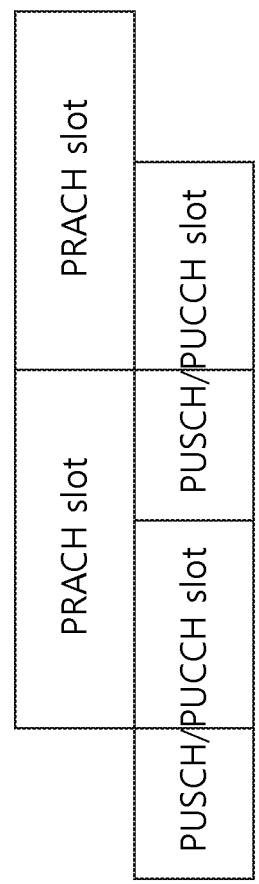
FIG. 11 shows an example of slot structure according to an embodiment of the present invention.

FIG. 11 shows an example of slot structure according to an embodiment of the present invention. Referring to FIG. 11, one PRACH slot may affect two PUSCH slots even with low TA values. To utilize resources, the network may schedule first short PUSCH/PUCCH in the first PUCCH/PUSCH slot over first few symbols, and second short PUSCH/PUCCH in the second PUCCH/PUSCH slot over last few symbols. This may restrict the scheduling of PUSCH/PUCCH when slot-based scheduling is used.

Options for the TA offset value may be as follows.

(1) N1 (PDSCH to PUCCH HARQ timing in terms of number of symbols)+M1 (number of symbols used for PUCCH transmission): For example, N1 is 2 symbols, and M1 is 2 symbols, the TA offset value may be 4 symbols. In term of realizing the TA offset, particularly when it is applied to TA, the TA offset may be applied by increasing slot index by 1.

Figure 12:
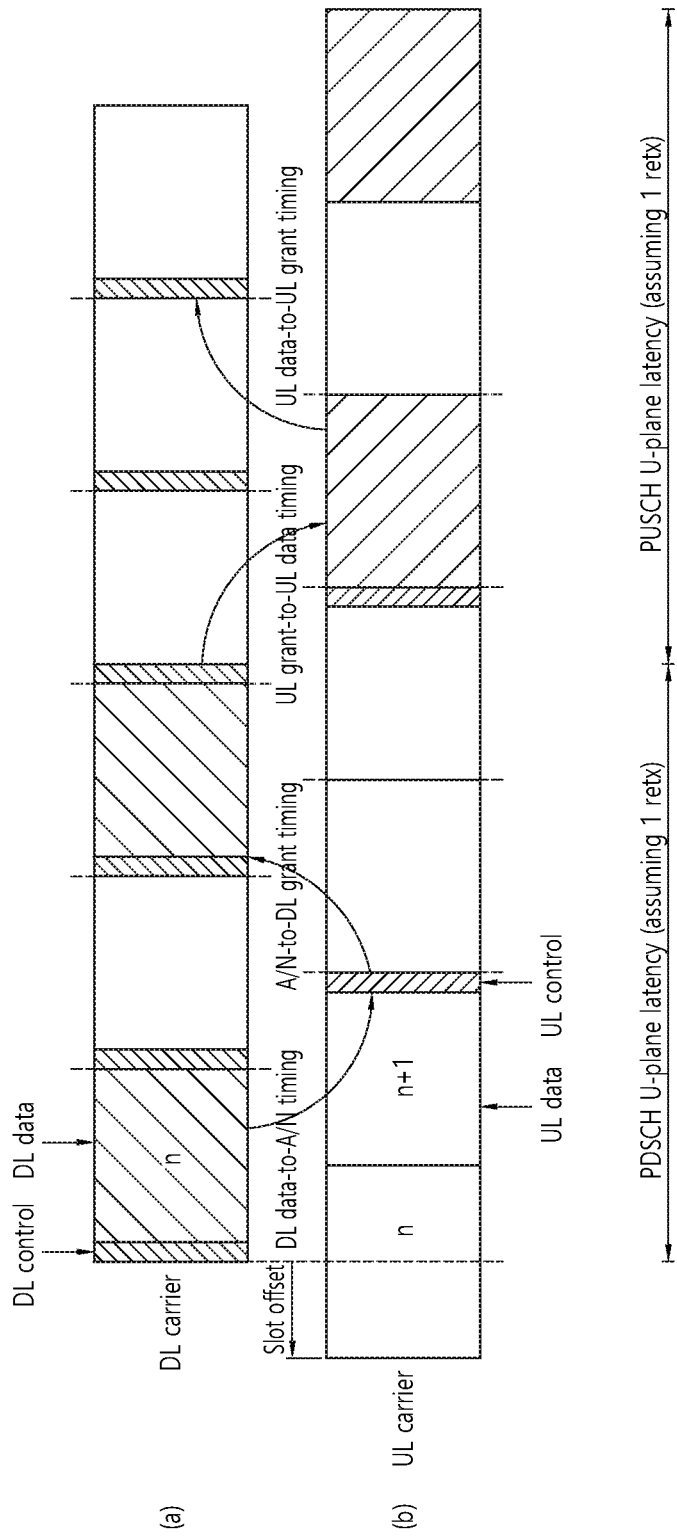
FIG. 12 shows an example of applying TA offset according to an embodiment of the present invention.

FIG. 12 shows an example of applying TA offset according to an embodiment of the present invention. FIG. 12-(a) shows DL portion. FIG. 12-(b) shows UL portion in which the TA offset is applied according to the present invention. For the network, 14 symbols of offset time budget may be allowed for retransmission.

Meanwhile, negative value may be considered for the TA offset. In this case, the TA offset value may be K1+M1, and the UL subframe/slot boundary can be pushed forwardly.

(2) In LTE-NR coexistence case, the UL subframe/slot may be shifted by max (N1, P1) or N1+M1+1 (for LTE sounding reference signal (SRS) protection). P is the number of OFDM symbols not usable to NR due to LTE PDCCH. As LTE-NR coexistence may always not utilize 1 to 3 symbols, the timing may be used for processing/preparing HARQ-ACK/PUCCH.

Figure 13:
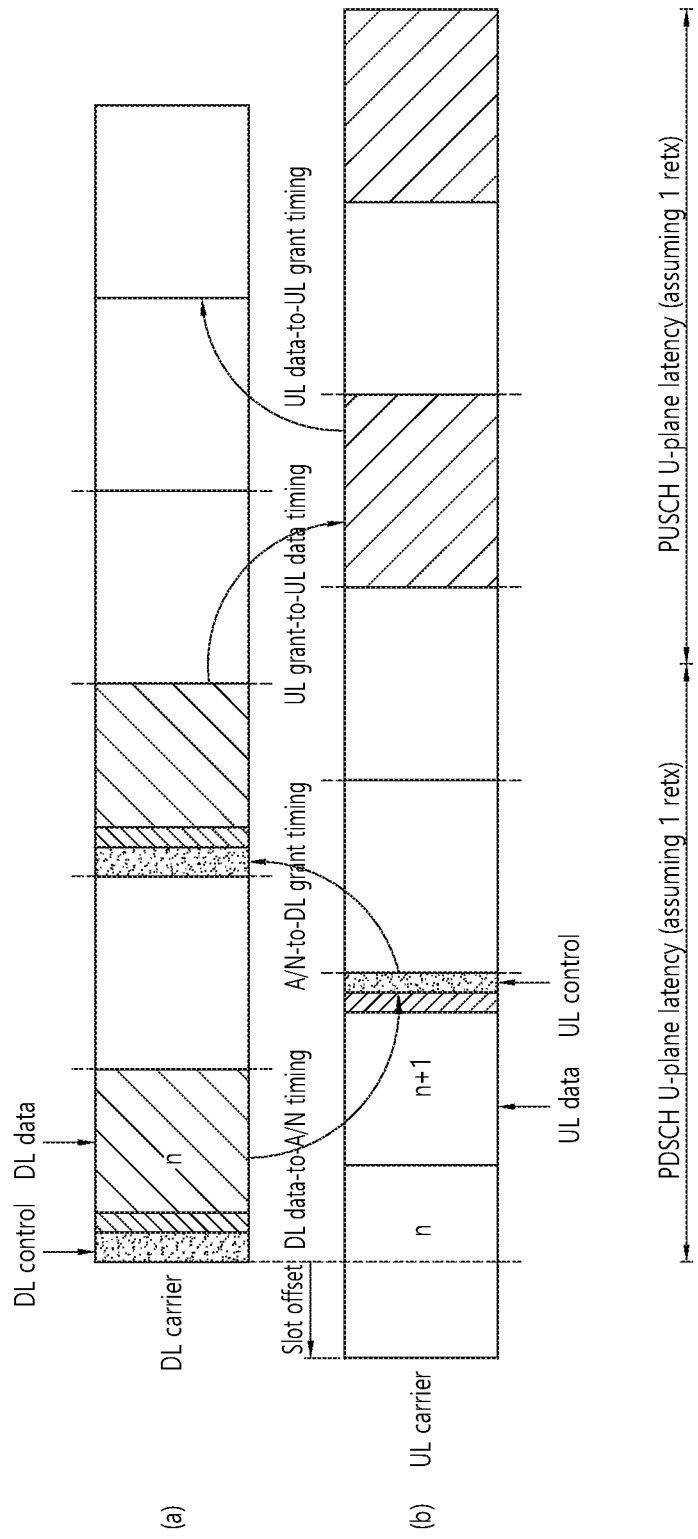
FIG. 13 shows an example of applying TA offset according to an embodiment of the present invention.

FIG. 13 shows an example of applying TA offset according to an embodiment of the present invention. FIG. 13-(a) shows DL portion. FIG. 13-(b) shows UL portion in which the TA offset is applied according to the present invention. Referring to FIG. 13-(b), the UL subframe/slot is shifted based on the TA offset.

Figure 14:
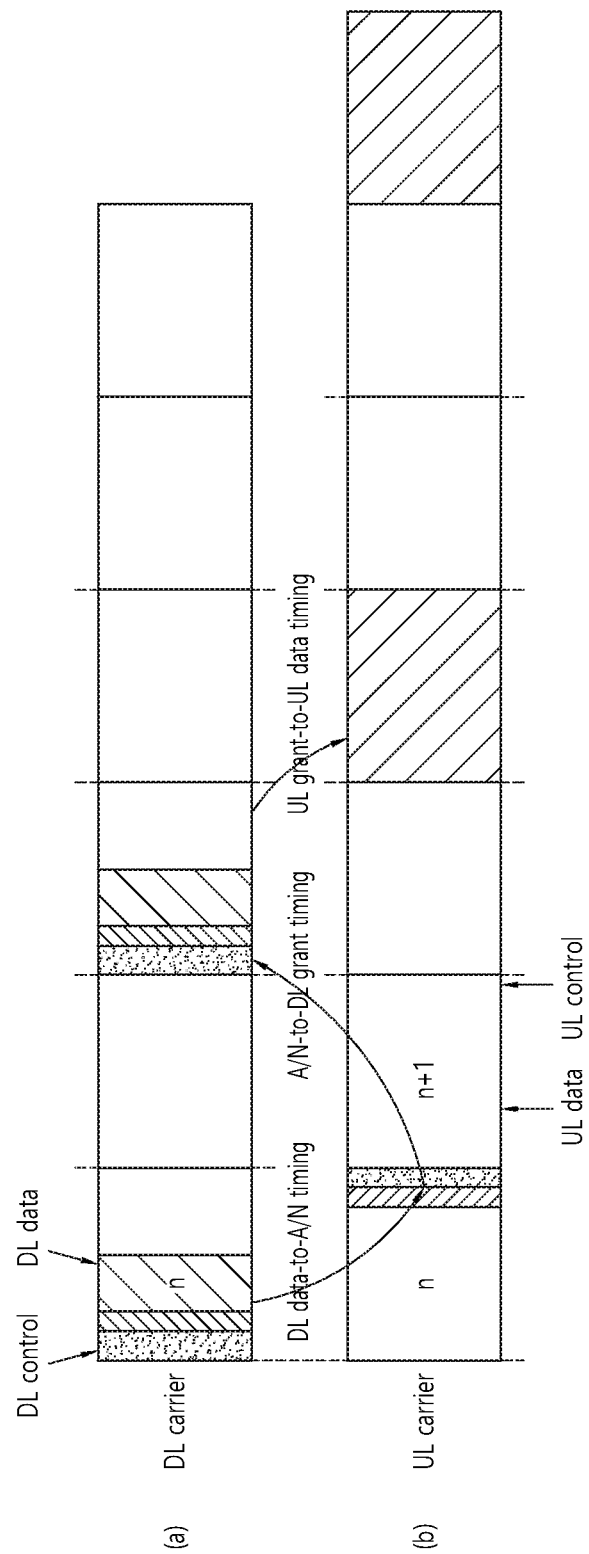
FIG. 14 shows an example of not applying TA offset.

FIG. 14 shows an example of not applying TA offset. FIG. 14-(a) shows DL portion. FIG. 14-(b) shows UL portion in which the TA offset is not applied. Referring to FIG. 14-(b), to utilize partial subframe structure to achieve low latency, the number of OFDM symbols usable for UE is very limited. That is, the overall usable DL resources may decrease significantly.

In summary, the followings may impact the specification.

(1) The TA offset may be realized by only by positive TA (i.e. pull UL subframe/slot by TA+offset). In this case, to allow same-slot PUCCH transmission related to PDSCH, subframe/slot index for UL subframe/slot may be increased by 1. Otherwise, in FDD, the minimum subframe/slot index where PUCCH can be transmitted related to PDSCH at subframe/slot n is slot n+1 (i.e. K1=1). In this sense, self-slot scheduling framework may not be usable if the TA offset is realized by only by positive TA. To utilize resources wasted by PRACH transmission due to unalignment between different subframe/slot boundaries, partial PUSCH transmissions may still be necessary.

(2) The TA offset is realized by negative TA (i.e. push UL slot by TA+offset). For example, the TA offset value may be −4 symbols. In this case, the UE needs to be indicated with TA offset either by RMSI or higher layer signaling. In this case, if signaling is done by RMSI, PRACH may also apply the TA offset, and PRACH preamble may be transmitted in UL subframe/slot after applying the TA offset.

(3) Half-duplex FDD UEs: By shifting UL subframe/slot, UL may start in the middle of DL in some cases, which anyway occurs due to TA. In this case, partial UL data may be scheduled depending on cases. As long as flexible duration (including starting time) is indicated by scheduling, this may be easily addressed.

Figure 15:
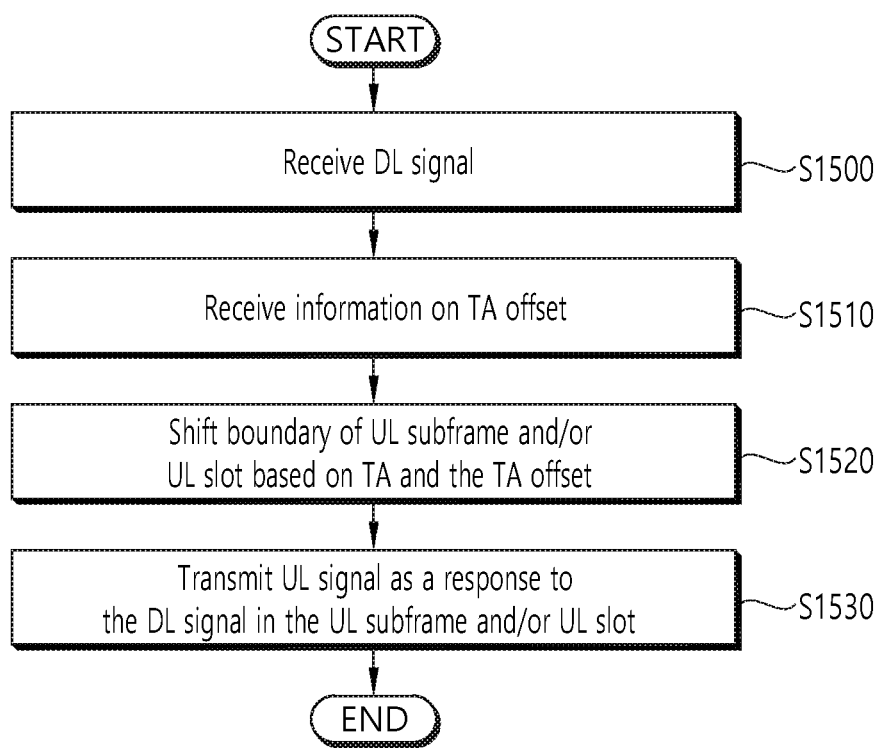
FIG. 15 shows a method for shifting boundary of UL subframe and/or UL slot by a UE according to an embodiment of the present invention.

FIG. 15 shows a method for shifting boundary of UL subframe and/or UL slot by a UE according to an embodiment of the present invention. The present invention described above for UE side may be applied to this embodiment.

In step S1500, the UE receives DL signal from a network.

In step S1510, the UE receives information on a TA offset from the network.

The TA offset may be a negative value. Or, the TA offset may be positive value.

The information on the TA offset may be received via RMSI. Or, the TA offset may be fixed. In this case, the TA offset may be configured per frequency range or per frequency band.

The TA offset may be configured in terms of number of symbols based on a numerology used in a synchronization SSB. Or, the TA offset may be configured in terms of number of symbols based on a numerology used in RMSI. Or, the TA offset may be configured in terms of number of symbols based on a numerology used in the UL subframe and/or the UL slot.

In step S1520, the UE shifts the boundary of the UL subframe and/or the UL slot based on a TA and the TA offset.

In step S1530, the UE transmits a UL signal as a response to the DL signal in the UL subframe and/or UL slot.

The DL signal may be DL data, and the UL signal may be ACK/NACK signal of the DL data. Or, the DL signal is a UL grant scheduling PUSCH, and the UL signal may be UL data transmitted via the PUSCH. Furthermore, the TA offset may be applied to PRACH preamble transmission.

According to embodiment of the present invention shown in FIG. 15, by shifting UL subframe/slot based on the TA offset in addition to TA, low latency required by NR can be achieved. Especially, when the value of the TA offset is negative, i.e. UL subframe/slot is pushed forwardly, self-subframe/slot scheduling can be supported efficiently. Consequently, reduced timing between DL signal and UL signal in NR can be efficiently supported.

Figure 16:
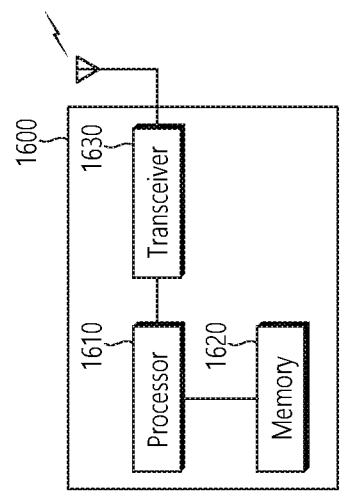
FIG. 16 shows a UE to implement an embodiment of the present invention.

FIG. 16 shows a UE to implement an embodiment of the present invention. The present invention described above for UE side may be applied to this embodiment.

A UE 1600 includes a processor 1610, a memory 1620 and a transceiver 1630. The processor 1610 may be configured to implement proposed functions, procedures and/or methods described in this description. Layers of the radio interface protocol may be implemented in the processor 1610. Specifically, the processor 1610 controls the transceiver 1630 to receive a DL signal from a network, controls the transceiver 1630 to receive information on TA offset from the network, shifts boundary of UL subframe and/or UL slot based on a TA and the TA offset, and controls the transceiver 1630 to transmit a UL signal as a response to the DL signal in the UL subframe and/or UL slot.

The TA offset may be a negative value. Or, the TA offset may be positive value.

The information on the TA offset may be received via RMSI. Or, the TA offset may be fixed. In this case, the TA offset may be configured per frequency range or per frequency band.

The TA offset may be configured in terms of number of symbols based on a numerology used in a synchronization SSB. Or, the TA offset may be configured in terms of number of symbols based on a numerology used in RMSI. Or, the TA offset may be configured in terms of number of symbols based on a numerology used in the
UL subframe and/or the UL slot.

The DL signal may be DL data, and the UL signal may be ACK/NACK signal of the DL data. Or, the DL signal is a UL grant scheduling PUSCH, and the UL signal may be UL data transmitted via the PUSCH. Furthermore, the TA offset may be applied to PRACH preamble transmission.

The memory 1620 is operatively coupled with the processor 1610 and stores a variety of information to operate the processor 1610. The transceiver 1630 is operatively coupled with the processor 1610, and transmits and/or receives a radio signal.

The processor 1610 may include application-specific integrated circuit (ASIC), other chipset, logic circuit and/or data processing device. The memory 1620 may include read-only memory (ROM), random access memory (RAM), flash memory, memory card, storage medium and/or other storage device. The transceiver 1630 may include baseband circuitry to process radio frequency signals. When the embodiments are implemented in software, the techniques described herein can be implemented with modules (e.g., procedures, functions, and so on) that perform the functions described herein. The modules can be stored in memory 1620 and executed by processor 1610. The memory 1620 can be implemented within the processor 1610 or external to the processor 1610 in which case those can be communicatively coupled to the processor 1610 via various means as is known in the art.

According to embodiment of the present invention shown in FIG. 16, by shifting UL subframe/slot based on the TA offset in addition to TA, low latency required by NR can be achieved. Especially, when the value of the TA offset is negative, i.e. UL subframe/slot is pushed forwardly, self-subframe/slot scheduling can be supported efficiently. Consequently, reduced timing between DL signal and UL signal in NR can be efficiently supported.

Figure 17:
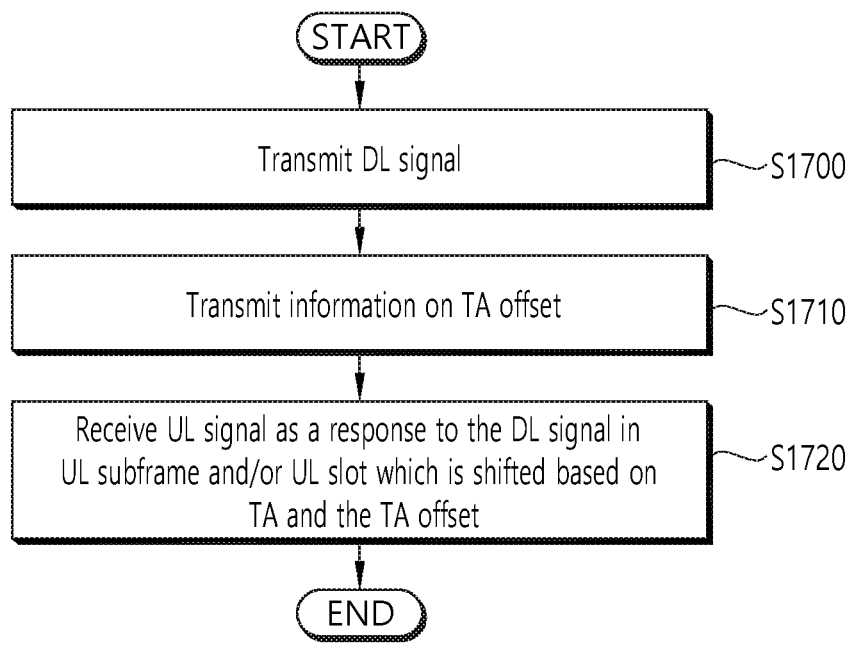
FIG. 17 shows a method for receiving UL signal by a BS according to an embodiment of the present invention.

FIG. 17 shows a method for receiving UL signal by a BS according to an embodiment of the present invention. The present invention described above for BS side may be applied to this embodiment.

In step S1700, the BS transmits DL signal to a UE.

In step S1710, the BS transmits information on a TA offset to the UE.

The TA offset may be a negative value. Or, the TA offset may be positive value.

The information on the TA offset may be transmitted via RMSI. Or, the TA offset may be fixed. In this case, the TA offset may be configured per frequency range or per frequency band.

The TA offset may be configured in terms of number of symbols based on a numerology used in a synchronization SSB. Or, the TA offset may be configured in terms of number of symbols based on a numerology used in RMSI. Or, the TA offset may be configured in terms of number of symbols based on a numerology used in the UL subframe and/or the UL slot.

In step S1720, the BS receives the UL signal as a response to the DL signal in a UL subframe and/or UL slot which is shifted based on a TA and the TA offset.

The DL signal may be DL data, and the UL signal may be ACK/NACK signal of the DL data. Or, the DL signal is a UL grant scheduling PUSCH, and the UL signal may be UL data transmitted via the PUSCH. Furthermore, the TA offset may be applied to PRACH preamble transmission.

According to embodiment of the present invention shown in FIG. 17, the information on the TA offset can be provided to the UE. By shifting UL subframe/slot based on the TA offset in addition to TA, low latency required by NR can be achieved. Especially, when the value of the TA offset is negative, i.e. UL subframe/slot is pushed forwardly, self-subframe/slot scheduling can be supported efficiently. Consequently, reduced timing between DL signal and UL signal in NR can be efficiently supported.

Figure 18:
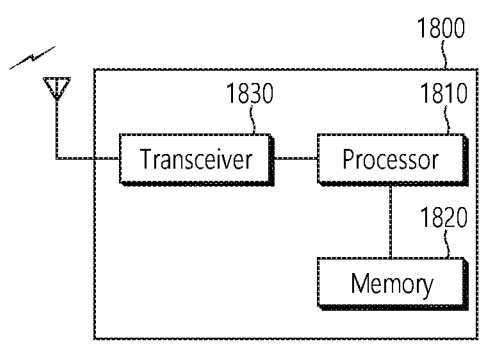
FIG. 18 shows a BS to implement an embodiment of the present invention.

FIG. 18 shows a BS to implement an embodiment of the present invention. The present invention described above for BS side may be applied to this embodiment.

A BS 1800 includes a processor 1810, a memory 1820 and a transceiver 1830. The processor 1810 may be configured to implement proposed functions, procedures and/or methods described in this description. Layers of the radio interface protocol may be implemented in the processor 1810. Specifically, the processor 1810 controls the transceiver 1830 to transmit DL signal to a UE, controls the transceiver 1830 to transmit information on a TA offset to the UE, and controls the transceiver 1830 to receive the UL signal as a response to the DL signal in a UL subframe and/or UL slot which is shifted based on a TA and the TA offset.

The TA offset may be a negative value. Or, the TA offset may be positive value.

The information on the TA offset may be transmitted via RMSI. Or, the TA offset may be fixed. In this case, the TA offset may be configured per frequency range or per frequency band.

The TA offset may be configured in terms of number of symbols based on a numerology used in a synchronization SSB. Or, the TA offset may be configured in terms of number of symbols based on a numerology used in RMSI. Or, the TA offset may be configured in terms of number of symbols based on a numerology used in the UL subframe and/or the UL slot.

The DL signal may be DL data, and the UL signal may be ACK/NACK signal of the DL data. Or, the DL signal is a UL grant scheduling PUSCH, and the UL signal may be UL data transmitted via the PUSCH. Furthermore, the TA offset may be applied to PRACH preamble transmission.

The memory 1820 is operatively coupled with the processor 1810 and stores a variety of information to operate the processor 1810. The transceiver 1830 is operatively coupled with the processor 1810, and transmits and/or receives a radio signal.

The processor 1810 may include ASIC, other chipset, logic circuit and/or data processing device. The memory 1820 may include ROM, RAM, flash memory, memory card, storage medium and/or other storage device. The transceiver 1830 may include baseband circuitry to process radio frequency signals. When the embodiments are implemented in software, the techniques described herein can be implemented with modules (e.g., procedures, functions, and so on) that perform the functions described herein. The modules can be stored in memory 1820 and executed by processor 1810. The memory 1820 can be implemented within the processor 1810 or external to the processor 1810 in which case those can be communicatively coupled to the processor 1810 via various means as is known in the art.

According to embodiment of the present invention shown in FIG. 18, the information on the TA offset can be provided to the UE. By shifting UL subframe/slot based on the TA offset in addition to TA, low latency required by NR can be achieved. Especially, when the value of the TA offset is negative, i.e. UL subframe/slot is pushed forwardly, self-subframe/slot scheduling can be supported efficiently. Consequently, reduced timing between DL signal and UL signal in NR can be efficiently supported.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   receiving a downlink (DL) data from a network;
   determining an acknowledgement/negative-acknowledgement (ACK/NACK) transmission timing as a timing after a predetermined time interval from an end of a reception of the DL data;
   based on that a processing time of the DL data is less than the predetermined time interval minus an offset, transmitting an ACK/NACK for the DL data to the network by applying the offset to a timing advance (TA) so that the ACK/NACK is transmitted at the offset earlier than the ACK/NACK transmission timing; and
   transmitting an UL data to the network by applying the offset to the TA after transmitting the ACK/NACK,
   wherein the offset is configured by the network.

2. The method of claim 1, wherein information on the offset is received via a remaining minimum system information (RMSI).

3. The method of claim 1, wherein the offset is configured per frequency range or per frequency band.

4. The method of claim 1, wherein the offset is configured in terms of number of symbols based on a numerology used in a synchronization signal block (SSB) including synchronization signals and a physical broadcast channel (PBCH).

5. The method of claim 1, wherein the offset is configured in terms of number of symbols based on a numerology used in RMSI.

6. The method of claim 1, wherein the offset is configured in terms of number of symbols based on at least one of a numerology used in a UL subframe or a UL slot.

7. The method of claim 1, wherein the offset is applied to a physical random access channel (PRACH) preamble transmission.

8. The method of claim 1, wherein the UE is in communication with at least one of a mobile device, a network, or autonomous vehicles other than the UE.

9. A user equipment (UE) in a wireless communication system, the UE comprising:
   a memory;
   a transceiver, and
   at least one processor, operably coupled to the memory and the transceiver, configured to:
   control the transceiver to receive a downlink (DL) data from a network;
   determine an acknowledgement/negative-acknowledgement (ACK/NACK) transmission timing as a timing after a predetermined time interval from an end of a reception of the DL data;
   based on that a processing time of the DL data is less than the predetermined time interval minus an offset,
   control the transceiver to transmit an ACK/NACK for the DL data to the network by applying the offset to a timing advance (TA) so that the ACK/NACK is transmitted at the offset earlier than the ACK/NACK transmission timing; and control the transceiver to transmit an uplink (UL) data to the network by applying the offset to the TA after transmitting the ACK/NACK,
wherein the offset is configured by the network.

* * * * *